(12) United States Patent
Wang et al.

(10) Patent No.: US 11,630,926 B2
(45) Date of Patent: Apr. 18, 2023

(54) OPTIMIZATION METHOD FOR SCREEN SURFACE DYNAMIC LOAD OF VIBRATING SCREEN

(71) Applicant: Wuhan University of Science and Technology, Wuhan (CN)

(72) Inventors: Lei Wang, Wuhan (CN); Yuyao Guo, Wuhan (CN); Zelin Zhang, Wuhan (CN); Xuhui Xia, Wuhan (CN); Jie Long, Wuhan (CN); Xiang Liu, Wuhan (CN); Weimin Jing, Wuhan (CN); Xuguo Yan, Wuhan (CN); Baotong Chen, Wuhan (CN); Tong Wang, Wuhan (CN); Jianhua Cao, Wuhan (CN); Huan Zhang, Wuhan (CN); Jinliang Zhou, Wuhan (CN); Wu Guo, Wuhan (CN)

(73) Assignee: Wuhan University of Science and Technology, Wuhan (CN)

( * ) Notice: Subject to any disclaimer, the term of this patent is extended or adjusted under 35 U.S.C. 154(b) by 0 days.

(21) Appl. No.: 17/870,734

(22) Filed: Jul. 21, 2022

(65) Prior Publication Data
US 2023/0077394 A1 Mar. 16, 2023

(30) Foreign Application Priority Data
Jun. 11, 2021 (CN) .......................... 2021106569961

(51) Int. Cl.
*G06F 30/17* (2020.01)
*G06F 30/25* (2020.01)

(52) U.S. Cl.
CPC .............. *G06F 30/17* (2020.01); *G06F 30/25* (2020.01)

(58) Field of Classification Search
CPC .......... G06F 30/17; G06F 30/25; G06F 30/00; G06F 2111/10
(Continued)

(56) References Cited

U.S. PATENT DOCUMENTS
2012/0051911 A1 3/2012 Baik et al.

FOREIGN PATENT DOCUMENTS
CN 105868470 A 8/2016
CN 106202693 A * 12/2016 ......... G06F 17/5018
(Continued)

OTHER PUBLICATIONS

Deb, Kalyanmoy et al. "A Fast and Elitist Multiobjective Genetic Algorithm: NSGA-II", Apr. 2002, IEEE Transactions on Evolutionary Computation, vol. 6, No. 2, IEEE. (Year: 2002).*
(Continued)

*Primary Examiner* — Cedric Johnson
(74) *Attorney, Agent, or Firm* — Nitin Kaushik (57) ABSTRACT

The present invention discloses an optimization method for a screen surface dynamic load of a vibrating screen. The method includes the following steps: step 1. selecting design variables, and establishing an experimental matrix; step 2. performing a response curved surface experiment; step 3. establishing two double-objective optimization models and solving the same to obtain two groups of Pareto solution sets, wherein the solution sets respectively represent screening efficiency optimization paths of the vibrating screen under the conditions of a high screen surface dynamic load and a low screen surface dynamic load; and step 4. calculating an optimization space for a screen surface dynamic load under a high screening efficiency. According to the method of the present invention, the screen surface dynamic load can be directly reduced, and the service life of the screen surface and the whole vibrating screen is prolonged.

5 Claims, 3 Drawing Sheets (58) Field of Classification Search
USPC .......................................................... 703/7, 6
See application file for complete search history.

(56) References Cited

FOREIGN PATENT DOCUMENTS

| CN | 106202693 A | | 12/2016 | |
|---|---|---|---|---|
| CN | 111523178 A | | 8/2020 | |
| CN | 111539132 A | | 8/2020 | |
| CN | 111783285 A | | 10/2020 | |
| CN | 113283114 A | * | 8/2021 | ............. G06F 30/20 |

OTHER PUBLICATIONS

Emmerich, Michael T. et al., "A Tutorial on Multiobjective Optimization: Fundamentals and Evolutionary Methods", May 31, 2018, Natural Computing, Springer. (Year: 2018).*

Andoh, P.Y. et al., "Optimizing the Weight Clogged of a Vibrating Screen During Mining Operations", 2021, Journal of Science and Technology, vol. 39, Nos. 1 and 2, Journal of Science and Technology. (Year: 2021).*

* cited by examiner

OPTIMIZATION METHOD FOR SCREEN SURFACE DYNAMIC LOAD OF VIBRATING SCREEN

CROSS-REFERENCE TO RELATED APPLICATIONS

The application claims priority to Chinese patent application No. 2021106569961, filed on Jun. 11, 2021, the entire contents of which are incorporated herein by reference.

TECHNICAL FIELD

The present invention belongs to the technical field of mechanical equipment, and relates to a vibrating screen, in particular to an optimization method for a screen surface dynamic load of a vibrating screen.

BACKGROUND

A vibrating screen works by using a reciprocating rotary vibration generated by vibrator excitation. An upper rotating heavy hammer of a vibrator causes a screen surface to generate a plane whirling vibration, while a lower rotating heavy hammer causes the screen surface to generate a conical surface whirling vibration. Such a combined effect makes the screen surface generate a compound whirling vibration. An amplitude can be changed by adjusting the exciting forces of the upper and lower rotating heavy hammers. By adjusting spatial phase angles of the upper and lower heavy hammers, a curve shape of a movement trajectory of the screen surface and a movement trajectory of materials on the screen surface can be changed.

The vibrating screen separates granular materials according to the granularity through a high-frequency vibration, and thus is widely used in coal mines, agriculture, metallurgy and other fields owing to its simple structure and efficient production. There is a huge demand for vibrating screens with high screening performances, stable structural performances and long service life in the industry.

The prior art has the following major problems and defects.

The research on the screening process of the vibrating screen focuses on a screening efficiency, i.e., performs screening efficiency optimization from process parameters, motion forms, screen surface structures and the like by using methods such as physical experiments, theoretical derivation, and virtual simulation. However, a screen surface dynamic load is not considered in the optimization process, which improves the screening efficiency, but the screen surface dynamic load is not reduced, and even possibly increased. An excessive screen surface dynamic load will directly accelerate the corrosion of the screen surface structure, and indirectly increase loads on a side plate, an auxiliary beam and other structures of the vibrating screen, resulting in an adverse effect that the service life of the whole vibrating screen is short and the service life of the screen surface is relatively shorter. By adding the auxiliary beam to improve the structural performance of the screen surface, although the stress and strain concentration on the screen surface can be alleviated, the impact corrosion on the screen surface and the forces on a screen box and a vibration isolation system cannot be reduced, and an effective screening area of the screen surface may also be reduced, thereby affecting the screening efficiency.

SUMMARY

With respect to the above problems and defects existing in the prior art, the present invention provides an optimization method for a screen surface dynamic load of a vibrating screen, which can reduce the screen surface dynamic load directly, reduce an overall structural load of a screening machine indirectly, and prolong the service life of the screen surface and the whole vibrating screen.

Therefore, the present invention adopts the following technical solutions.

An optimization method for a screen surface dynamic load of a vibrating screen includes the following steps:

step 1. selecting design variables, and establishing an experimental matrix;

step 2. performing a response curved surface experiment;

step 3. establishing two double-objective optimization models and solving the same to obtain two groups of Pareto solution sets, wherein the solution sets respectively represent screening efficiency optimization paths of the vibrating screen under the conditions of a high screen surface dynamic load and a low screen surface dynamic load; and step 4. calculating an optimization space for the screen surface dynamic load under a high screening efficiency.

Preferably, in the step 1, the method of establishing the experimental matrix includes:

S11. selecting factors that have a greater impact on the screening efficiency and the screen surface dynamic load as design variables;

S12. determining factor levels, and determining the experimental matrix by using a center-circumscribed compound method; and S13. performing a pre-experimental test on the experimental matrix.

Preferably, in S11, the number of the design variables is preferably 3-4; and the design variables include an excitation parameter, a screen mesh shape, and a screen surface inclination angle.

Preferably, in S13, the process of performing the pre-experimental test on the experimental matrix includes the following steps:

S131. calculating a throwing index r or a vibration intensity K, of the screen surface in all the experimental points in an experimental table;

$$\tau = \frac{A(2\pi f)^2}{g \cos\alpha},$$

$$K_o = \frac{Aw^2 \sin\beta}{g \cos\alpha};$$

wherein A represents a vibration amplitude; f represents a vibration frequency; g represents an acceleration of gravity; β represents a vibration direction angle; α represents a screen surface inclination angle; w represents an angular frequency;

S132. selecting three experimental points with the lowest throwing index or vibration intensity of the screen surface in the experimental matrix for pre-experiment; and S133. determining whether material screening systems corresponding to the three pre-experiment points can reach a steady state, and completing the pre-experiment if all material screening systems reach a steady state, otherwise returning to the step S12 to re-adjust the factor levels.

Preferably, in S133, the method of determining whether the material screening systems corresponding to the three pre-experiment points can reach the steady state includes: acquiring an acceleration signal on a side plate of the vibrating screen through an accelerometer, and considering that the material screening system reaches the steady state if the signal reaches a steady state.

Preferably, in the step 3, the process of establishing the two double-objective optimization models and solving the same includes:

S31: establishing a mathematical model of the screening efficiency and the screen surface dynamic load through multiple linear regression:

S32: establishing two double-objective optimization models; and

S33: solving the two double-objective optimization problems by applying a non-dominated sorting genetic algorithm-II, NSGA-II, algorithm to obtain two groups of Pareto solution sets.

Preferably, in S31, evaluation indexes for the screening efficiency are shown in the following formulas:

$$M_c = 100 \gamma_c Q_f,$$

$$M_f = 100 \gamma_f Q_c,$$

$$F_c = \gamma_e - M_c + M_f,$$

$$F_f = \gamma_f - M_f + M_c,$$

$$E_c = \frac{\gamma_c - M_f}{F_c},$$

$$E_f = \frac{\gamma_f - M_f}{F_f},$$

$$\eta = E_c + E_f - 100;$$

wherein $M_c$ is the content of misplaced materials in screen overflow, that is, a percentage of fine particles in the screen overflow to the feed, %; $M_f$ is the content of misplaced materials in screen underflow, that is, a percentage of coarse particles in the screen underflow to the feed,%; $\gamma_c$ is an actual yield of the screen overflow,%; $\gamma_f$ is an actual yield of the screen underflow, %; $Q_f$ is the content of fine particles in the screen overflow,%; $Q_c$ is the content of the coarse particles in the screen underflow,%; $F_c$ is the content of coarse particles in the feed, that is, a theoretical yield of the screen overflow, %; $F_f$ is the content of fine particles in the feed, that is, a theoretical yield of the screen underflow, %; $E_c$ is a positive matching efficiency of coarse particles, %; $E_f$ is a positive matching efficiency of fine particles, %; $\eta$ is the screening efficiency, %;

a screen surface dynamic load index takes a mean value of differences between peak values of a stress signal at the connection between a screen surface structure and a side plate under unloaded and loaded conditions of the vibrating screen as a quantitative index, denoted as F, and is calculated according to the following formula:

$$F = \sum_{i=1}^{n} \overline{\Delta F_i},$$

$$\overline{\Delta F_i} = \overline{F_{iload}} - \overline{F_{iunload}};$$

wherein $\overline{F_{iload}}$ and $\overline{F_{iunload}}$ are mean values of maximum stress values at an $i^{th}$ measuring point in unit time under the stable loaded and unloaded states of a screening machine, respectively.

Preferably, in S32, the double-objective optimization models are as follows:

$$\begin{cases} \text{Max}(M_{Efficiency}) \\ \text{Max}(M_{load}) \\ \frac{Aw^2 \sin\beta}{g\cos\alpha} > a_1 \\ \frac{A(2\pi f)^2}{g\cos\alpha} > a_2 \\ x_{imin} < x_i < x_{imax} \end{cases},$$

$$\begin{cases} \text{Min}(M_{Efficiency}) \\ \text{Min}(M_{load}) \\ \frac{Aw^2 \sin\beta}{g\cos\alpha} > a_1 \\ \frac{A(2\pi f)^2}{g\cos\alpha} > a_2 \\ x_{imin} < x_i < x_{imax} \end{cases};$$

wherein $M_{efficiency}$ represents a function expression of the screening efficiency; $M_{load}$ represents a function expression of the screen surface dynamic load; $a_1$ represents a minimum value of a throwing index of the screen surface in an experimental point; $a_2$ represents a minimum value of a vibration intensity in the experimental point; A represents the vibration amplitude; g represents the acceleration of gravity; $\beta$ represents the vibration direction angle; $\alpha$ represents the screen surface inclination angle; $X_i$ represents a variable in an objective function; $X_{imin}$ represents a lower limit of the variable $X_i$; and $X_{imax}$ represents an upper limit of the variable $X_i$.

Preferably, in S33, a solution set obtained according to $$\begin{cases} \text{Max}(M_{Efficiency}) \\ \text{Max}(M_{load}) \\ \frac{Aw^2 \sin\beta}{g\cos\alpha} > a_1 \\ \frac{A(2\pi f)^2}{g\cos\alpha} > a_2 \\ x_{imin} < x_i < x_{imax} \end{cases}$$

is taken as a first solution set, and a solution set obtained according $$\text{to} \begin{cases} \text{Min}(M_{Efficiency}) \\ \text{Min}(M_{load}) \\ \frac{Aw^2 \sin\beta}{g\cos\alpha} > a_1 \\ \frac{A(2\pi f)^2}{g\cos\alpha} > a_2 \\ x_{imin} < x_i < x_{imax} \end{cases}$$

is taken as a second solution set.

Preferably, in step 4, the calculation formula is as follows:

$$(\text{Optimization space})_i = \frac{(\text{screen surface dynamic load})_n - (\text{screen surface dynamic load})_{i1}}{(\text{screen surface dynamic load})_{i2}} \quad (5)$$

wherein the (optimization space), represents an optimization space for a screen surface dynamic load under a certain screening efficiency level; the (screen surface dynamic load)$_{i1}$ represents a screen surface dynamic load value in the first solution set corresponding to this screening efficiency; and the (screen surface dynamic load)$_{i2}$ represents a screen surface load value in the second solution set corresponding to this screening efficiency.

Compared with the prior art, the method of the present invention has the following technical effects:

(1) a process parameter configuration scheme of the vibrating screen that can simultaneously achieve a high screening efficiency and a low screen surface dynamic load can be obtained;

(2) the screen surface dynamic load can be directly reduced, the overall structural load of the screening machine is indirectly reduced, and the service life of the screen surface and the whole vibrating screen is prolonged; and (3) an effective screening area of the screen surface is improved, and an optimization space is increased.

DETAILED DESCRIPTION OF THE EMBODIMENTS

The present invention discloses an optimization method for a screen surface dynamic load of a vibrating screen, which solves the problems in the prior art that a vibrating screen is seriously affected by particle impact, resulting in low structural performances of a screening machine and short service life of the screening machine.

The above objective of the present invention is achieved by the following technical solutions.

An optimization method for a screen surface dynamic load of a vibrating screen includes the following steps:

S1. selecting design variables, and establishing an experimental matrix:

S2. performing a response curved surface experiment;

S3. establishing two double-objective optimization models and solving the same to obtain two groups of Pareto solution sets, wherein the solution sets respectively represent screening efficiency optimization paths of the vibrating screen under the conditions of a high screen surface dynamic load and a low screen surface dynamic load: and S4. calculating an optimization space for the screen surface dynamic load under a high screening efficiency, wherein a specific calculation method is shown in Formula 1:

$$(\text{Optimization space})_i = \frac{(\text{screen surface load})_{i1} - (\text{screen surface load})_{i2}}{(\text{screen surface load})_{i2}} \quad (1)$$

wherein an (optimization space); represents an optimization space for a screen surface dynamic load under a certain screening efficiency level; a (screen surface dynamic load)$_{i1}$ represents a screen surface dynamic load value in the first solution set corresponding to this screening efficiency: and the (screen surface dynamic load)$_{i2}$ represents a screen surface dynamic load value in the second solution set corresponding to this screening efficiency.

In the step S1, the method of selecting the design variables and establishing the experimental matrix includes:

S11. selecting factors that have a greater impact on the screening efficiency and the screen surface dynamic load as design variables, such as an excitation parameter, a screen mesh shape, and a screen surface inclination angle, wherein the number of the design variables is preferably 3-4;

S12. determining factor levels, and determining the experimental matrix by using a center-circumscribed compound (CCC) method; and S13. performing a pre-experimental test on the experimental matrix.

In S13, the method of performing the pre-experimental test on the experimental matrix includes the following specific steps:

S131. calculating a throwing index τ or a vibration intensity $K_v$ of the screen surface in all the experimental points in an experimental table;

$$\tau = \frac{A(2\pi f)^2}{g\cos\alpha} \quad (2)$$

$$K_v = \frac{Aw^2 \sin\beta}{g\cos\alpha} \quad (3)$$

S132. selecting three experimental points with the lowest throwing index or lowest vibration intensity of the screen surface in the experimental matrix for pre-experiment; and S133. determining whether material screening systems corresponding to the three pre-experiment points can reach a steady state, and completing the pre-experiment if all material screening systems reach a steady state, otherwise returning to the step S12 to re-adjust the factor levels.

In S133, the method of determining whether the material screening systems corresponding to the three pre-experiment points can reach the steady state includes: acquiring an acceleration signal on a side plate of the vibrating screen through an accelerometer, and considering that the material screening system reaches the steady state if the signal reaches a steady state.

In the step 2, the process of establishing the two double-objective optimization models and solving the same includes:

S21: establishing mathematical models of the screening efficiency and the screen surface dynamic load through multiple linear regression, wherein evaluation indexes of the screening efficiency are shown in Formulas 4-10:

$$M_c = 100\gamma_c Q_f \quad (4)$$

$$M_f = 100\gamma_f Q_c \quad (5)$$

$$F_c = \gamma_e - M_c + M_f \quad (6)$$

$$F_f = \gamma_f - M_f + M_c \quad (7)$$

$$E_c = \frac{\gamma_c - M_f}{F_c} \quad (8)$$

$$E_f = \frac{\gamma_f - M_f}{F_f} \quad (9)$$

$$\eta = E_c + E_f - 100 \quad (10)$$

wherein $M_c$ is the content of misplaced materials in screen overflow (coarse particles), that is, a percentage of fine particles in the screen overflow to the feed, %; $M_f$ is the content of misplaced materials in screen underflow (fine particles), that is, a percentage of coarse particles in the screen underflow to the feed, %; $\gamma_c$ is an actual yield of the screen overflow (coarse particles), %; $\gamma_f$ is an actual yield of the screen underflow (fine particles), %; $Q_f$ is the content of fine particles in the screen overflow (coarse particles), %; $Q_c$ is the content of the coarse particles in the screen underflow (fine particles), %; $F_c$ is the content of coarse particles in the feed, that is, a theoretical yield of the screen overflow (coarse particles).%; $F_f$ is the content of fine particles in the feed, that is, a theoretical yield of the screen underflow (fine particles), %; $E_c$ is a positive matching efficiency of coarse particles, %; $E_f$ is a positive matching efficiency of fine particles, %; and $\eta$ is the screening efficiency, %;

a screen surface dynamic load index takes a mean value of differences between peak values of a stress signal at the connection between a screen surface structure and the side plate under unloaded and loaded conditions of the vibrating screen as a quantitative index, denoted as F; the specific calculation formulas are shown in Formula 11 and Formula 12, wherein $\overline{F_{iload}}$ and $\overline{F_{iunload}}$ are mean values of maximum stress values at an $i^{th}$ measuring point in unit time under the stable loaded and unloaded states of the screen machine, respectively;

$$F = \sum_{i=1}^{n} \overline{\Delta F_i} \quad (11)$$

$$\overline{\Delta F_i} = \overline{F_{iload}} - \overline{F_{iunload}} \quad (12)$$

S22: establishing two double-objective optimization models, which are specifically as shown in the following formulas:

$$\begin{cases} \text{Max}(M_{Efficiency}) \\ \text{Max}(M_{load}) \\ \frac{Aw^2 \sin\beta}{g\cos\alpha} > a_1 \\ \frac{A(2\pi f)^2}{g\cos\alpha} > a_2 \\ x_{imin} < x_i < x_{imax} \end{cases} \quad (13)$$

$$\begin{cases} \text{Min}(M_{Efficiency}) \\ \text{Min}(M_{load}) \\ \frac{Aw^2 \sin\beta}{g\cos\alpha} > a_1 \\ \frac{A(2\pi f)^2}{g\cos\alpha} > a_2 \\ x_{imin} < x_i < x_{imax} \end{cases} \quad (14)$$

wherein $M_{efficiency}$ represents a function expression of the screening efficiency; $M_{load}$ represents a function expression of the screen surface dynamic load; $a_1$ represents a minimum value of a throwing index of the screen surface in an experimental point; $a_2$ represents a minimum value of a vibration intensity in the experimental point; A represents the vibration amplitude; g represents the acceleration of gravity; $\beta$ represents the vibration direction angle; a represents the screen surface inclination angle; $X_i$ represents a variable in an objective function; $X_{imin}$ represents a lower limit of the variable $X_i$; and $X_{imax}$ represents an upper limit of the variable $X_i$; and S23: solving two double-objective optimization problems by applying an NSGA-II algorithm to obtain two groups of Pareto solution sets. A solution set obtained according to Formula 13 is taken as a first solution set, and a solution set obtained according to Formula (14) is taken as a second solution set.

EMBODIMENTS

Figure 1:
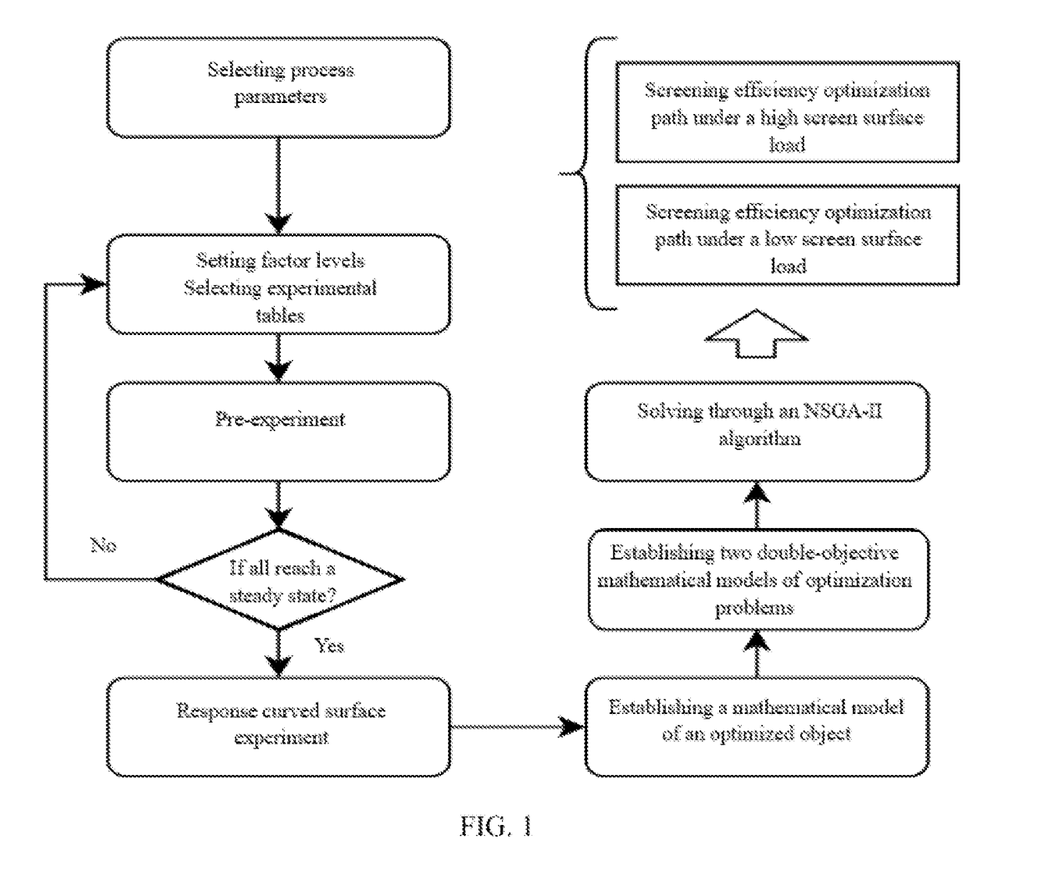
FIG. 1 is a flowchart of an optimization method for a screen surface dynamic load of a vibrating screen as provided by an embodiment of the present invention.
Figure 2:
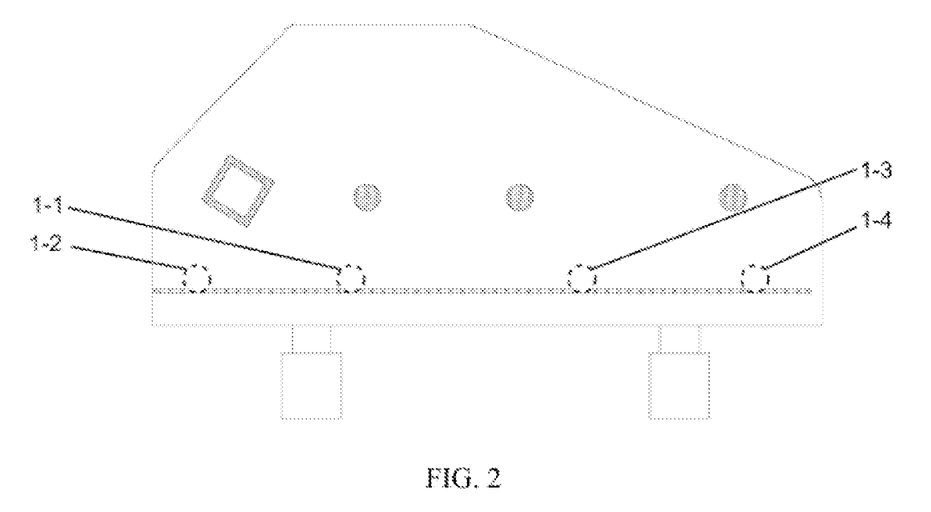
FIG. 2 is a schematic diagram of positional layout of stress sensors for a side plate on a screen surface in the embodiment of the present invention.
Figure 3:
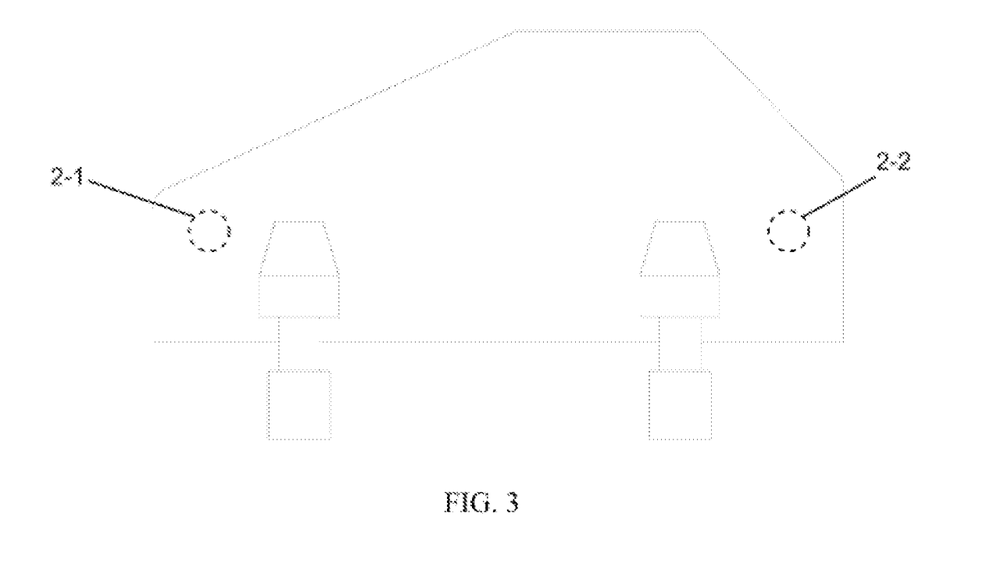
FIG. 3 is a schematic diagram of positional layout of acceleration sensors for the side plate on the screen surface in the embodiment of the present invention.

As shown in FIG. 1, the present invention provides an optimization method for a screen surface dynamic load of a vibrating screen. In this embodiment, experiments are carried out with linear screens. The size of a screen surface of each linear screen is 2,000 mm*1,300 mm, and a screen surface inclination angle can be adjusted by a support structure. There are four stress sensors in total, namely a first stress sensor 1-1, a second stress sensor 1-2, a third stress sensor 1-3, and a fourth stress sensor 1-4 respectively, and their arrangement positions are shown in FIG. 2. There are two acceleration sensors in total, namely a first acceleration sensor 2-1 and a second acceleration sensor 2-2 respectively, and their arrangement positions are shown in FIG. 3.

In S1: experiments are performed by using the linear screens. Excitation parameters (amplitude. frequency, and vibration direction angle) and the screen surface inclination angle are selected as design variables, and a feed flow rate is set to 16 t/h. A set of effective experimental matrices are determined through pre-experiments, and the specific factor level settings and experimental tables are shown in Tables 1 and 2. Based on relevant theories of a stochastic process, in each group of experiments, whether a steady state is reached is determined through the acceleration sensors, particle size distribution and stress data of particles over and under the screen in the steady state are collected, and the screen surface dynamic load and the screening efficiency data in the experiments obtained by calculation are shown in Table 2. A calculation formula for the screen surface load is shown in Formula 15:

$$F = 0.1\overline{\Delta F_1} + 0.2\overline{\Delta F_2} + 0.3\overline{\Delta F_3} + 0.4\overline{\Delta F_4} \quad (15).$$

TABLE 1

Design variables and factor level settings

| Factor | Level | | | | |
|---|---|---|---|---|---|
| | −2 | −1 | 0 | 1 | 2 |
| A (mm) | 6.5 | 5.5 | 4.5 | 3.5 | 2.5 |
| f (Hz) | 12 | 14.5 | 17 | 19.5 | 22 |
| α (°) | 2 | 4.5 | 7 | 9.5 | 12 |
| β (°) | 40 | 4.5 | 50 | 55 | 60 |

TABLE 2

Design variables and factor level settings

| Operating sequence | Amplitude | Frequency | Screen surface inclination angle | Vibration direction angle | Screening efficiency (%) | Screen surface lead (N) |
|---|---|---|---|---|---|---|
| 1 | −1 | −1 | −1 | −1 | 85.026 | 3.2629 |
| 2 | 0 | 0 | 0 | 0 | 81.649 | 2.9097 |
| 3 | 0 | 0 | 0 | −2 | 83.633 | 2.7794 |
| 4 | 1 | −1 | −1 | −1 | 89.172 | 3.7480 |
| 5 | 0 | 0 | 0 | 0 | 81.165 | 2.8000 |
| 6 | 0 | −2 | 0 | 0 | 88.36 | 3.3472 |
| 7 | −1 | 1 | 1 | 1 | 67.205 | 2.7970 |
| 8 | −1 | −1 | −1 | 1 | 84.351 | 3.9317 |
| 9 | 0 | 0 | 0 | 0 | 81.29 | 2.8728 |
| 10 | 0 | 2 | 0 | 0 | 73.891 | 2.9012 |
| 11 | 2 | 0 | 0 | 0 | 86.144 | 3.1731 |
| 12 | 0 | 0 | −2 | 0 | 85.913 | 4.2500 |
| 13 | −1 | −1 | 1 | −1 | 79.859 | 2.5077 |
| 14 | −1 | 1 | −1 | 1 | 75.618 | 3.6539 |
| 15 | 0 | 0 | 0 | 0 | 81.78 | 2.9262 |
| 16 | −2 | 0 | 0 | 0 | 74.398 | 2.9219 |
| 17 | 0 | 0 | 0 | 0 | 81.577 | 2.8464 |
| 18 | 1 | −1 | 1 | 1 | 83.098 | 2.8907 |
| 19 | 0 | 0 | 0 | 0 | 81 | 2.9024 |
| 20 | 1 | −1 | −1 | 1 | 89.106 | 4.7786 |
| 21 | 0 | 0 | 0 | 2 | 80.595 | 3.5892 |
| 22 | 1 | 1 | 1 | −1 | 79.029 | 2.4312 |
| 23 | 1 | −1 | 1 | −1 | 85.198 | 2.6472 |
| 24 | −1 | 1 | 1 | −1 | 71.963 | 2.4563 |
| 25 | −1 | 1 | −1 | −1 | 76.983 | 3.0416 |
| 26 | 1 | 1 | −1 | 1 | 82.837 | 3.8878 |
| 27 | 0 | 0 | 0 | 0 | 81.492 | 2.8501 |
| 28 | 1 | 1 | 1 | 1 | 76.053 | 2.7751 |
| 29 | −1 | −1 | 1 | 1 | 77.842 | 2.8018 |
| 30 | 1 | 1 | −1 | −1 | 84.05 | 3.1497 |
| 31 | 0 | 0 | 2 | 0 | 73.865 | 2.4410 |

In S2: functional relationships among the screen surface load, the screening efficiency and the design variables are established respectively by using a multiple linear regression method. As shown in FIG. 16 and FIG. 17, $M_e$ is the screening efficiency. and $M_s$ is the screen surface load. Therefore, the two double-objective optimization models are established and shown in Formulas 18 and 19.

$$M_e = \hspace{5cm} (16)$$
$$0.885 + 0.0624*x1*-0.00108*x2*+0.00506*x3*+0.00351*x4 -$$
$$0.00621*x1*x1*-0.000034*x2*x2*-0.000728*x3*x3 -$$
$$0.002039*x1*x2*0.000742*x1*x3*+0.000044*x2*x3 -$$
$$0.000036*x2*x4*-0.000056*x3*x4$$

$$M_s = 14.01 - 1.671*x1*-0.602*x2*-0.715* \hspace{2cm} (17)$$
$$x3*+0.0651*x4*+0.0475*x1*x1*+0.00734*x2*x2*$$
$$+0.01620*x3*x3*+0.0422*x1*x2 + 0.0498*x1*x3*$$
$$+0.01600*x2*x3*-0.00050*x2*x4*-0.00457 + x3 + x4$$

$$\begin{cases} \min M_s(x_1, x_2, x_3, x_4) \\ \min M_e(x_1, x_2, x_3, x_4) \\ \text{s.t.} \quad \dfrac{Aw^2\sin\beta}{g\cos\alpha} > 3.3 \\ \dfrac{A(2\pi f)^2}{g\cos\alpha} > 3.5 \\ x_{imin} < x_i < x_{imax} \; i \in 1, 2, 3, 4 \end{cases} \hspace{1cm} (18)$$

$$\begin{cases} \max M_s(x_1, x_2, x_3, x_4) \\ \max M_e(x_1, x_2, x_3, x_4) \\ \text{s.t.} \quad \dfrac{Aw^2\sin\beta}{g\cos\alpha} > 3.3 \\ \dfrac{A(2\pi f)^2}{g\cos\alpha} > 3.5 \\ x_{imin} < x_i < x_{imax} \; i \in 1, 2, 3, 4 \end{cases} \hspace{1cm} (19)$$

In S3, two groups of Pareto solution sets are solved by using an NSGA-II algorithm, wherein the solution sets respectively represent screening efficiency optimization paths of the vibrating screen under the conditions of a high screen surface dynamic load and a low screen surface dynamic load.

In S4: the screen surface dynamic load under a high screening efficiency is calculated to optimize an optimization space. When the screening efficiency is 80%, a space for the screen surface load can be optimized by about 39%; when the screening efficiency is 85%, a space for the screen surface load can be optimized by about 26%; the screening efficiency is 90%, a space for the screen surface load can be optimized by about 18%.

A configuration scheme of some process parameters in the optimization path of the low screen surface load is shown in Table 3.

TABLE 3

Configuration scheme of process parameters of the low screen surface load during the vibration under a high screening efficiency

| Sequence | Amplitude | Frequeney | Inclination angle | Direction angle | Screen surface dynamic load | Screening efficiency |
|---|---|---|---|---|---|---|
| 1 | 3.72 | 16.98 | 2.03 | 69.98 | 6.210 | 7.089 |
| 2 | 365 | 20.38 | 2.09 | 69.98 | 5.752 | 6.097 |
| 3 | 4.01 | 21.66 | 2.08 | 69.97 | 5.469 | 5.580 |
| 4 | 4.86 | 21.87 | 2.1 | 69.98 | 5.282 | 5.356 |
| 5 | 5.57 | 21.91 | 2.09 | 69.99 | 5.161 | 5.191 |

What is claimed is:

1. An optimization method for a screen surface dynamic load of a vibrating screen, comprising following steps:

step 1. selecting design variables, and establishing an experimental matrix;

step 2. performing a response curved surface experiment;

step 3. establishing two double-objective optimization models and solving the two double-objective optimization models to obtain two groups of Pareto solution sets, wherein the two groups of Pareto solution sets respectively represent screening efficiency optimization paths of the vibrating screen under conditions of a high screen surface dynamic load and a low screen surface dynamic load; and step 4. calculating an optimization space for the screen surface dynamic load under a high screening efficiency, wherein:

in the step 3, the method of establishing the two double-objective optimization models and solving the two double-objective optimization models comprises:

establishing mathematical models of a screening efficiency and the screen surface dynamic load through multiple linear regression;

establishing the two double-objective optimization models; and solving two double-objective optimization problems by applying a non-dominated sorting genetic algorithm-II NSGA-II, to obtain the two groups of Pareto solution sets;

in the method of establishing mathematical models of the screening efficiency and the screen surface dynamic load, evaluation indexes for the screening efficiency are shown in following formulas:

$M_c = 100 \gamma_c Q_f$, $M_f = 100 \gamma_f Q_c$, $F_c = \gamma_c - M_c + M_f$, $F_f = \gamma_f - M_f + M_c$, $E_c = \dfrac{\gamma_c - M_f}{F_c}$, $E_f = \dfrac{\gamma_f - M_f}{F_f}$, $\eta = E_c + E_f - 100$;

wherein $M_c$ is content of misplaced materials in screen overflow, that is, a percentage of fine particles in the screen overflow to a feed, %; $M_f$ is the content of the misplaced materials in screen underflow, that is, a percentage of coarse particles in the screen underflow to the feed, %; $\gamma_c$ is an actual yield of the screen overflow, %; $\gamma_f$ is an actual yield of the screen underflow, %; $Q_f$ is content of the fine particles in the screen overflow, %; $Q_c$ is content of the coarse particles in the screen underflow, %; $F_c$ is the content of the coarse particles in the feed, that is, a theoretical yield of the screen overflow, %; $F_f$ is the content of the fine particles in the feed, that is, a theoretical yield of the screen underflow, %; $E_c$ is a positive matching efficiency of the coarse particles, %; $E_f$ is a positive matching efficiency of the fine particles, %; $\eta$ is the screening efficiency, %;

a screen surface dynamic load index takes a mean value of differences between peak values of a stress signal at a connection between a screen surface structure and a side plate under unloaded and loaded conditions of the vibrating screen as a quantitative index, denoted as F, and is calculated according to the following formulas:

$$F = \sum_{i=1}^{n} \overline{\Delta F_i},$$

$\overline{\Delta F_i} = \overline{F_{iload}} - \overline{F_{iunload}}$;

wherein $\overline{F_{iload}}$ and $\overline{F_{iunload}}$ are mean values of maximum stress values at an $i^{th}$ measuring point in unit time under stable loaded and unloaded states of a screening machine, respectively;

in the method of establishing the two double-objective optimization models, the double-objective optimization models are as follows:

$$\begin{cases} \text{Max}(M_{Efficiency}) \\ \text{Max}(M_{load}) \\ \dfrac{Aw^2 \sin\beta}{g\cos\alpha} > a_1 \\ \dfrac{A(2\pi f)^2}{g\cos\alpha} > a_2 \\ x_{imin} < x_i < x_{imax} \end{cases},$$

$$\begin{cases} \text{Min}(M_{Efficiency}) \\ \text{Min}(M_{load}) \\ \dfrac{Aw^2 \sin\beta}{g\cos\alpha} > a_1 \\ \dfrac{A(2\pi f)^2}{g\cos\alpha} > a_2 \\ x_{imin} < x_i < x_{imax} \end{cases};$$

wherein $M_{efficiency}$ represents a function expression of the screening efficiency; $M_{load}$ represents a function expression of the screen surface dynamic load; $a_1$ represents a minimum value of a throwing index of the screen surface in an experimental point; $a_2$ represents a minimum value of a vibration intensity in the experimental point; A represents a vibration amplitude; g represents an acceleration of gravity; β represents a vibration direction angle; α represents a screen surface inclination angle; w represents an angular frequency; f represents a vibration frequency; $X_i$ represents a variable in an objective function; $X_{imin}$ represents a lower limit of the variable $X_i$; and $X_{imax}$ represents an upper limit of the variable $X_i$;

in the method of solving the two double-objective optimization problems by applying the NSGA-II, a solution set obtained according to $$\begin{cases} \text{Max}(M_{Efficiency}) \\ \text{Max}(M_{load}) \\ \dfrac{Aw^2\sin\beta}{g\cos\alpha} > a_1 \\ \dfrac{A(2\pi f)^2}{g\cos\alpha} > a_2 \\ x_{imin} < x_i < x_{imax} \end{cases}$$

is taken as a first solution set, and a solution set obtained according to $$\begin{cases} \text{Min}(M_{Efficiency}) \\ \text{Min}(M_{load}) \\ \dfrac{Aw^2\sin\beta}{g\cos\alpha} > a_1 \\ \dfrac{A(2\pi f)^2}{g\cos\alpha} > a_2 \\ x_{imin} < x_i < x_{imax} \end{cases}$$

is taken as a second solution set; and in the step 4, a calculation formula is as follows:

$$(\text{Optimization space})_i = \frac{(\text{screen surface dynamic load})_{i1} - (\text{screen surface dynamic load})_{i2}}{(\text{screen surface dynamic load})_{i2}};$$

wherein, the (optimization space)$_i$ represents the optimization space for the screen surface dynamic load under a certain screening efficiency level; the (screen surface dynamic load)$_{i1}$ represents a screen surface dynamic load value in the first solution set corresponding to the screening efficiency; and the (screen surface dynamic load)$_{i2}$ represents a screen surface dynamic load value in the second solution set corresponding to the screening efficiency.

2. The optimization method for the screen surface dynamic load of the vibrating screen according to claim 1, wherein in the step 1, the method of establishing the experimental matrix comprises:
   selecting factors that have a greater impact on the screening efficiency and the screen surface dynamic load as the design variables;
   determining factor levels, and determining the experimental matrix by using a center-circumscribed compound method; and
   performing a pre-experimental test on the experimental matrix.

3. The optimization method for the screen surface dynamic load of the vibrating screen according to claim 2, wherein in the method of selecting factors, a number of the design variables is either 3 or 4; and the design variables include an excitation parameter, a screen mesh shape, and the screen surface inclination angle.

4. The optimization method for the screen surface dynamic load of the vibrating screen according to claim 2, wherein, the method of performing the pre-experimental test on the experimental matrix comprises the following steps:
   calculating the throwing index τ or the vibration intensity $K_v$ of the screen surface in all experimental points in an experimental table;

$$\tau = \frac{A(2\pi f)^2}{g\cos\alpha},$$

$$K_v = \frac{Aw^2\sin\beta}{g\cos\alpha};$$

wherein A represents the vibration amplitude; f represents the vibration frequency; g represents the acceleration of gravity; β represents the vibration direction angle; α represents the screen surface inclination angle; w represents the angular frequency;
   selecting three experimental points with the lowest throwing index or lowest vibration intensity of the screen surface in the experimental matrix for pre-experiment; and
   determining whether material screening systems corresponding to three pre-experiment points can reach a steady state, and completing the pre-experiment test if all material screening systems reach the steady state, otherwise returning to re-adjust the factor levels.

5. The optimization method for the screen surface dynamic load of the vibrating screen according to claim 4, wherein, the method of determining whether the material screening systems corresponding to the three pre-experiment points can reach the steady state, comprising the following steps:
   acquiring an acceleration signal on the side plate of the vibrating screen through an accelerometer, and
   determining that the material screening system reaches the steady state if the acceleration signal reaches a steady state.

* * * * *